United States Patent
Fennel et al.

(10) Patent No.: US 6,173,229 B1
(45) Date of Patent: Jan. 9, 2001

(54) MICROPROCESSOR ARRANGEMENT FOR A VEHICLE-CONTROL SYSTEM

(75) Inventors: Helmut Fennel, Bad Soden; Bernhard Kant, Hochheim; Herman Esselbrügge, Weiterstadt; Michael Zydek, Langgöns; Bernhard Giers, Frankfurt am Main, all of (DE)

(73) Assignee: Continental Teves AG & Co. oHG (DE)

( * ) Notice: Under 35 U.S.C. 154(b), the term of this patent shall be extended for 0 days.

(21) Appl. No.: 09/230,860

(22) PCT Filed: Jul. 4, 1997

(86) PCT No.: PCT/EP97/03528

§ 371 Date: Dec. 3, 1999

§ 102(e) Date: Dec. 3, 1999

(87) PCT Pub. No.: WO98/05540

PCT Pub. Date: Feb. 12, 1998

(30) Foreign Application Priority Data

Aug. 2, 1996 (DE) .............................. 196 31 309

(51) Int. Cl.$^7$ .............................. B60T 8/88; G06F 15/16; G05B 9/03
(52) U.S. Cl. .................................... 701/91; 701/36; 700/2
(58) Field of Search .................................. 701/82, 91, 92, 701/97, 36; 395/181, 182.04, 182.09, 800.32, 200.5, 800.34, 200.78; 364/131, 133, 134; 714/2, 6, 11; 709/220, 248; 700/2, 4, 5

(56) References Cited

U.S. PATENT DOCUMENTS

| | | | |
|---|---|---|---|
| 5,001,641 | * | 3/1991 | Makino ........................ 364/426.02 |
| 5,193,887 | * | 3/1993 | Bleckmann et al. .................. 303/92 |
| 5,411,324 | * | 5/1995 | Zydek et al. ....................... 303/92 |

(List continued on next page.)

FOREIGN PATENT DOCUMENTS

| | | |
|---|---|---|
| 36 10 620 | 10/1987 | (DE) . |
| 39 01 257 | 8/1989 | (DE) . |
| 41 37 124 | 5/1993 | (DE) . |

(List continued on next page.)

OTHER PUBLICATIONS

Preiss, Edmund: Redundantes Mikrocontollersystem. In: Elektronik Informationen, No. Oct. 1991, pp. 98–100; p. 98.
Weiss, R.: Fehletorerante Rechnersysteme. In: Regelungstechnische Praxis, 25th Yr., 1983, Issue 10. pp. 408–416; p. 414, recht Spalte.

(List continued on next page.)

Primary Examiner—Tan Nguyen
Assistant Examiner—Dalena Tran
(74) Attorney, Agent, or Firm—Rader, Fishman & Grauer PLLC

(57) ABSTRACT

A microprocessor configuration for a control system of a vehicle comprises a plurality of microprocessor systems (4,5,6) which are interconnected by bus systems (1,2,3) and include an anti-lock and/or traction slip control system and further control systems, which require complex computing operations, as well as an input signal conditioning system (SC). For the purpose of error detection one part of the data processing is performed "symmetrically" redundantly in a plurality of microprocessor systems and another part of the data processing is additionally performed ("asymmetrically" redundantly) in accordance with simplified algorithms.

Two like master microprocessor systems (5,6) are provided which serve the symmetrically redundant data processing. The input signal conditioning and the processing in accordance with simplified algorithms are installed in a third microprocessor system (4). The output and/or intermediate results are compared for redundancy; moreover, the data processing performed in these microprocessor systems is each time compared and checked for plausibility with the results of the simplified data processing.

16 Claims, 1 Drawing Sheet

U.S. PATENT DOCUMENTS

| | | | |
|---|---|---|---|
| 5,485,379 | * | 1/1996 | Kremer .......................... 364/426.02 |
| 5,526,264 | * | 6/1996 | Niggemann et al. ........... 364/426.02 |
| 5,684,702 | * | 11/1997 | Phillips et al. ................. 364/426.021 |
| 5,713,643 | * | 2/1998 | Esselbrugge et al. .......... 303/122.08 |
| 5,862,502 | * | 1/1999 | Giers ..................................... 701/71 |

FOREIGN PATENT DOCUMENTS

| | | |
|---|---|---|
| 42 12 337 | 10/1993 | (DE) . |
| 43 02 925 | 8/1994 | (DE) . |
| 44 39 060 | 5/1996 | (DE) . |
| 196 06 098 | 8/1996 | (DE) . |
| 0 496 509 | 7/1992 | (EP) . |
| 94 00682 | 1/1994 | (WO) . |

OTHER PUBLICATIONS

Stöcker et al.: "Zuverlässigkeit von Electronischen Bauteilen Im Automobil" ATZ, vol. 93, No. 7/8, Jul., 1991–Aug., 1991 Stuttgart, Germany pp. 406–414.

Search report of the German Patent Office for German Appl. No. 196 31 309.1.

* cited by examiner

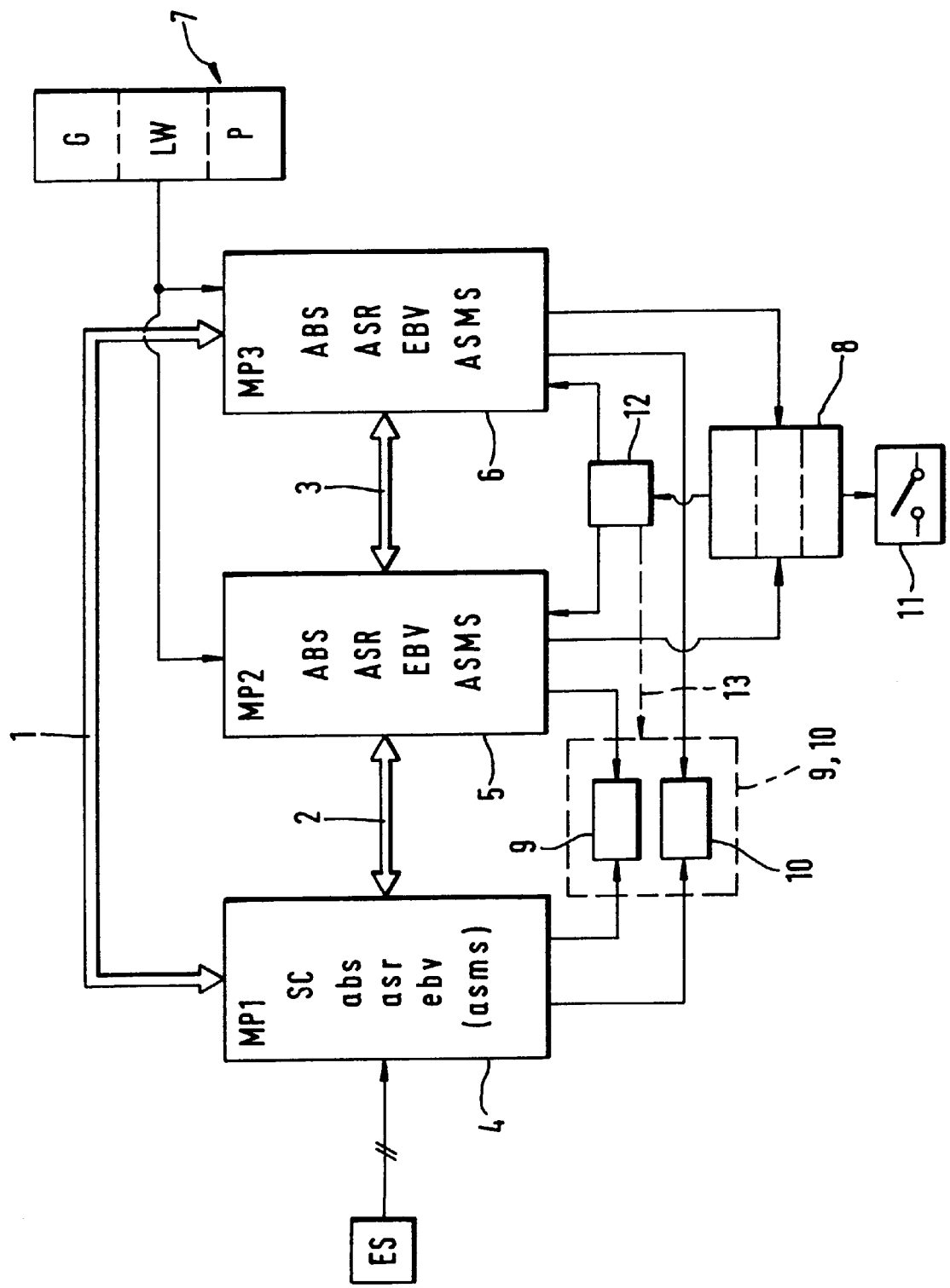

MICROPROCESSOR ARRANGEMENT FOR A VEHICLE-CONTROL SYSTEM

BACKGROUND OF THE INVENTION

This invention relates to a microprocessor configuration for control systems for vehicles that, for example, comprise inter alia anti-lock control systems (ABS), traction slip control systems (German abbreviation ASR=TCS), systems for electronic control of the braking force distribution (German abbreviation: EBV=EBD) as well as for yaw torque control, and driving stability control systems (German abbreviation: GMR=YTC; FSR=DSC; and ASMS), etc.

A great number of such control systems and system variants is known. Nowadays, the importance of such systems is rapidly increasing in view of the demand for higher safety standards and for more comfort.

It is also known to combine a plurality of control systems to form a compound system as the various functions are interactive and as parts of different control systems such as sensors, circuits for detecting and processing input control signals, monitoring systems etc. can be used jointly.

Microcomputer structures of various types are used for solving complex arithmetical problems. From DE 32 34 637 C2, e.g., an anti-lock control system has come to knowledge the control unit of which includes two or more parallel-working microcontrollers for the generation of braking pressure control signals. These microcontrollers process the same input signals in accordance with an identical computer program. The output signals and internal signals of the microcontroller are monitored for concurrence in order to detect any malfunctions in either of the two controllers. Electronic control will be switched off if the signals redundantly processed in the microcontrollers are differing from each other. This is done in order to ensure that the braking function, even if uncontrolled, will be kept up also if there comes up an error in the electronic system.

Such a circuit configuration with so-called asymmetrical redundancy also has already come to knowledge from DE 41 37 124 A1. In this circuit configuration, the input signals of the control system, namely the signals obtained by means of wheel sensors and representing the rotational behavior, are fed to two parallel microcontrollers. Only one of these two microcontrollers works through the full control program while the second microcontroller simulates the input information in a simplified form, processing it in accordance with simplified algorithms. By comparing the data processing results of the two microcontrollers for concurrence or, at least, for plausibility it is possible to recognize malfunctions or defects in the electronic system despite the simplified data processing.

Further, a microprocessor configuration of the type mentioned above is known from DE 44 39 060 A1(P 7714), which includes a plurality of microprocessor systems interconnected by bus systems. By means of this configuration it is possible to carry out anti-lock control and traction slip control as well as, at least, one further control function requiring complex computing operations, the monitoring functions included. This known microprocessor configuration includes three microprocessor systems, with the individual functions being allocated to these microprocessor systems so that the first microprocessor system, together with the second microprocessor system, takes over the ABS and ASR (=TCS) functions, the monitoring of these functions included. The third microprocessor system, together with the second microprocessor system, carries out the further control function (GMR=YTC), which requires complex computing operations, and the monitoring thereof. For the purpose of monitoring, this configuration makes use of the asymmetrically redundant data processing (by means of different computing processes or computer systems) or of the symmetrically redundant data processing (by means of like computing processes or computer systems) in two microprocessor systems at a time.

A high-degree operational reliability is achieved by means of the installation, described in the aforementioned DE 44 39 060 A1, of the various functions in only three microprocessor systems, the redundant signal processing included which serves monitoring purposes. If certain malfunctions of one control component are detected it will moreover be possible to switch off this component, only, while continuing other control functions.

It is now an object of the present invention to develop a microprocessor configuration for a complex vehicle control system, comprising a plurality of control components, which enables an even better, more sensitive and more balanced allocation of the monitoring of individual control functions or control systems with regard to safety demands or rather to the importance of these functions for the safety of the vehicle. What should be achieved in a way is the realization of a balanced safety concept.

SUMMARY OF THE INVENTION

It has been found out that this object can be achieved by a microprocessor configuration the particular feature of which consists in that two like master microprocessor systems are provided which are used for the redundant data processing; in that, further, the input signal conditioning and the processing in accordance with simplified algorithms, i.e., on the basis of asymmetrical redundancy, are installed in a third microprocessor system; and in that, at last, the output and/or intermediate results of the data processing taking place in the master microprocessor systems are compared amongst each other for concurrence and each time are compared with the output and/or intermediate results of the simplified data processing and are checked with these results for plausibility.

According to an advantageous embodiment it is expedient, in comparing and evaluating the redundantly processed data, to differentiate between "safety-critical" and "functionally essential" data or data which in view of safety are less critical. If there are any variations between the redundantly processed safety-critical data the entire vehicle control system will be switched off or, at least, the control systems concerned by the non-concurrent data will be put out of operation. In case of variations between less sensitive, functionally important data, the defective master microprocessor system will be identified by means of an individual comparison of the data of the two master microprocessor systems with the results of the simplified data processing. Then, the control functions will be continued completely or restrictedly by means of the intact microprocessor system.

If there occur discrepancies between the data processing results of the master microprocessor systems it will be possible to deactivate these two processor systems one after the other whereupon, if after deactivation of the system the data processing results concur with the result of the simplified data processing or rather are plausible, the control functions will at least be continued restrictedly on the basis of the valid, intact master microprocessor system and on the basis of the monitoring for plausibility by the third microprocessor system. Of course, only the essential data processing operations and control functions will be continued, not the safety-critical ones.

On the other hand, it is also possible to design the circuitry so that, upon the occurrence of any discrepancies between the data processing results of the master microprocessor systems, the data processing operations and control functions are continued on the basis of the results which are closer to the results established by the simplified data processing. Such a procedure, however, is not always expedient since such an interpretation may lead to problems if there come up fortuitous results because of the malfunctions. It is therefore safer to deactivate the two master microprocessor systems one after the other, as mentioned above, and to thus find out which system is defective.

According to another example of an embodiment of this invention, it is provided that, upon the occurrence of discrepancies between the data processing results, certain control functions or system functions are canceled in dependence on the extent of the variation or on the number of non-concurrences per time unit, with again differentiating between "safety-critical" and, in terms of safety, "uncritical" control operations and system functions.

Any further details, advantages and applications of this invention will become evident from the following description with reference to one example of an embodiment of this invention.

BRIEF DESCRIPTION OF THE DRAWING

The accompanying FIGURE is a simplified schematical representation of the fundamental structure of a microprocessor configuration according to this invention.

DETAILED DESCRIPTION OF THE DRAWING

As can be seen in this representation, the inventive microprocessor configuration includes three microprocessor systems 4,5,6 (MP1, MP2, and MP3) interconnected by a bus system which in the represented example is a ring bus 1,2,3. It might also be possible to use a star-shaped bus instead of the ring bus 1,2,3.

Referring to the illustration, "ES" symbolizes the input signals fed to the microprocessor 4 (MP1) via a bus. In a vehicle control system including ABS, ASR (=TCS), EBV (=EBD) etc., sensor signals representing the rotational behavior of the individual vehicle wheels are fed as input information to the first microprocessor system 4 (MP1). Additional information on the yaw angle, yaw angle speed, steering angle, braking pressure etc. is needed for a driving stability control (called GMR=YTC, FDR=DSC, or ASMS). This information is obtained by means of appropriate sensors or is established, as far as possible, by computation from the available information, in particular from the wheel sensor information. In the representation, these additional sensors and information are symbolized by a sensor unit 7 which, in this example, includes a yaw angle sensor G, a steering angle sensor LW, and a pressure sensor P. In this example, the output signal of sensor unit 7 is fed directly parallel to the two microprocessor systems MP2 and MP3. In another (non-represented) example of an embodiment, the signal conditioning for this information is likewise installed in the input microprocessor system 4 (MP1).

The inventive microprocessor configuration provides a redundant data processing in two complete microprocessor systems 5,6 (MP2, MP3). In the present example, the microprocessor configuration serves anti-lock control (ABS) as well as traction slip control (ASR=TCS), the control of braking force distribution (EBV=EBD) and driving stability control (ASMS=Automatic Stability Management System).

In the third microprocessor system MP1 realized by a simplified system in contrast to MP2 and MP3, above all conditioning and processing of the input signals (Signal Conditioning) take place. Moreover, the microprocessor system includes "simulations" abs, asr, ebv (asms), namely of the control systems ABS, ASR, EBV, ASMS installed in the two processor systems MP2 and MP3. "asms" was put in parentheses in MP1 because, in a preferred example of an embodiment, this control system was for safety reasons exclusively monitored by symmetrical redundancy, not by a simulation with simplified algorithms. However, it is quite possible to monitor, at least, some functions of the stability system (ASMS) by asymmetrical redundancy.

Symbolically represented in the illustration are moreover the redundancy members or comparators 8, 9, and 10 essential for this invention. In circuit 8, the final results and/or intermediate results of the two master microprocessor systems MP2 and MP3 are compared for concurrence. The monitoring is based on the so-called "symmetrical" redundancy. If there occur discrepancies or rather if there is no complete concurrence of the data processing results fed to the redundancy member 8 entire control will be switched off if the data and the control or system functions concerned are safety-critical. This is symbolized by a contact 11 which will release the control system or switch it on, only, if the compared signals completely concur.

By means of the comparators or redundancy members 9,10, the data processing results (final and/or intermediate results) of the master microprocessor systems 2,3 are moreover checked for concurrence or rather for plausibility with the data processing results obtained on the basis of the simplified algorithms. The check of the results or rather of the mode of operation of the microprocessor system MP2 takes place in comparator 9 while the microprocessor system MP3 is checked in comparator 10. The data line 13 represented by a broken line and leading from circuit 12 to circuit (9,10) indicates that this plausibility check only applies to the functionally essential data, yet not to the safety-critical data, nor to the safety-critical control or system functions, respectively, of the master microprocessors 5,6 (MP2, MP3). Of course, there is a multitude of possibilities to differentiate between safety-critical and functionally essential or less critical functions and to correspondingly balance the safety concept. For instance, the repeated occurrence of a malfunction which in itself is less critical can be considered a higher-degree safety risk and may thus lead to switching-off.

An advantageous example of an embodiment of this invention consists in that, upon the occurrence of a functionally essential error which is not critical in terms of safety, this error is localized via circuit 12 and the comparators 9,10. To this end, the microprocessor systems MP2 and MP3 are deactivated one after the other. If now concurrence or plausibility of the data processing results is ascertained by comparator 9 or 10 the control function will at least be continued for a predetermined period of time or up to a certain event such as the end of the current control cycle.

An example of a safety-critical function is the coming-on of the braking operation during driving stability control (ASMS).

An "unjustified braking intervention" is to be prevented for safety reasons. If comparator 8 detects a discrepancy in such a case ASMS will be put out of operation. Moreover, in this example, the error will be localized by means of the third microprocessor system 4 (MP1) and an ABS braking operation on the basis of the data computed by the intact microprocessor system MP2 and MP3 will be permitted if these data stand up to a check on the basis of the simplified logarithm by means of the microprocessor system MP1. This is one example out of a multitude of examples.

It is consequently possible to achieve a high safety level by means of the inventive microprocessor configuration. On the other hand, any errors that are critical to driving safety will lead to switching-off of control. In case of other, relatively uncritical malfunctions, it is on the other hand ensured that control will be continued completely or restrictedly, e.g., until a control operation is terminated. This "balancing" of the safety concept is a decisive advantage, especially so in complex control systems which combine very different control functions.

What is claimed is:

1. A microprocessor configuration for a control system of a vehicle comprising a plurality of microprocessor systems which are interconnected by bus systems and include at least one member of the group consisting of an anti-lock control system and a traction slip control system, and at least one additional control system, which requires complex computing operations, as well as an input signal conditioning system, wherein, for the purpose of error detection, the configuration being capable of performing one part of the data processing redundantly in a plurality of microprocessor systems in symmetrical redundancy and, additionally, one part of the data processing in accordance with simplified algorithms in asymmetrical redundancy, wherein the microprocessor configuration includes two like master microprocessor systems which are assigned to the redundant data processing; wherein a third microprocessor is adapted to perform the input signal conditioning and the processing in accordance with the simplified algorithms; and wherein the configuration is capable of comparing results of the data processing amongst each other for concurrence and of comparing and checking these results, for plausibility with the respective results of the simplified data processing.

2. A microprocessor configuration as claimed in claim 1, wherein, in comparing and evaluating the redundantly processed data, the configuration is capable of distinguishing between safety-critical and functionally essential data.

3. A microprocessor configuration as claimed in claim 2, wherein the configuration includes a safety device which, in case of discrepancies between the redundantly processed safety-critical data, switches off at least the control systems concerned by non-concurrent data.

4. A microprocessor configuration as claimed in claim 2, which is capable of identifying, in case of discrepancies between the functionally essential data, a defective master microprocessor system by means of individual comparison of the data of the two master microprocessor systems with the results of the simplified data processing in the third microprocessor system, and of continuing control functions, at least restrictedly, by means of the remaining intact master microprocessor system and by means of the third microprocessor system.

5. A microprocessor configuration as claimed in claim 4, which is capable of deactivating, one after the other, the two master microprocessor systems upon the occurrence of discrepancies between the data processing results of the master microprocessor systems and, if, after deactivation of one of the master microprocessor systems, the data processing results are plausible, of continuing control functions, at least restrictedly, on the basis of the remaining valid, intact master microprocessor system and on the basis of monitoring for plausibility.

6. A microprocessor configuration as claimed in claim 5, wherein the control functions being continued are only the functionally essential data processing operations and control functions not the safety-critical ones.

7. A microprocessor configuration as claimed in claim 4, wherein that master microprocessor systems is deemed the intact one whose results are closer to the results established by the simplified data processing.

8. A microprocessor configuration as claimed in claim 1, which is capable, upon the occurrence of discrepancies, of canceling certain control functions or system functions in dependence on the extent or number of non-concurrences per time unit, with differentiating between safety-critical and uncritical, functionally essential control functions and system functions.

9. A microprocessor control system of a vehicle, comprising:
a first microprocessing system interconnected in symmetrical redundancy to a second microprocessing system for redundant data processing, said first and second microprocessing systems each including a first control system utilizing complex computing operations and a second control system utilizing complex computing operations, said first control system being at least one of an anti-lock control system and a traction slip control system;
a third microprocessing control system interconnected to said first and second microprocessing control systems, said third microprocessing control system adapted to perform input signal conditioning and signal processing utilizing simplified algorithms; wherein
when said microprocessor control system compares results of the data processing between the first, second and third microprocessing systems according to predetermined rules.

10. The microprocessor control system of claim 9, wherein said predetermined rules distinguish between safety-critical and functionally essential data.

11. The microprocessor control system of claim 10, further comprising a safety device that, upon determination of a discrepancy between the safety-critical data, switches off at least the microprocessing system generating non-concurrent data.

12. The microprocessor control system of claim 10, wherein upon determination of a discrepancy between the functionally essential data, individual comparison is made between the first and third microprocessing control systems and the second and third microprocessing control systems to determine which of the first and second microprocessing systems is outputting nominal functionally essential data, and continuing control functions utilizing the nominally performing of the first and second microprocessing systems and the third microprocessing system.

13. The microprocessor control system of claim 12, wherein the nominally performing of the first and second microprocessing systems is outputting data having comparative results closer to the output of the third microprocessing system.

14. The microprocessor control system of claim 10, wherein upon determination of a discrepancy between the data output by the first and second microprocessing control systems, both the first and second microprocessing systems are deactivated one after the other, and wherein, following deactivation of the first and second microprocessing systems, the output data of one of the first and second microprocessing systems is determined by the predetermined rules to be plausible, control functions are continued, at least restrictedly, utilizing that microprocessing system and the third microprocessing system.

15. The microprocessor control system of claim 14, wherein the continued control functions are non-safety-critical control functions.

16. The microprocessor control system of claim 9, said third microprocessing system including a control system simulator.

* * * * *